United States Patent [19]
Van Gestel

[11] Patent Number: 4,912,555

[45] Date of Patent: Mar. 27, 1990

[54] TELEVISION RECEIVER INCLUDING A TELETEXT DECORDER

[75] Inventor: Henricus Van Gestel, Eindhoven, Netherlands

[73] Assignee: U.S. Philips Corporation, New York, N.Y.

[21] Appl. No.: 295,713

[22] Filed: Jan. 10, 1989

[30] Foreign Application Priority Data

Jan. 11, 1988 [NL] Netherlands .......................... 8800052

[51] Int. Cl.[4] .............................................. H04N 7/087

[52] U.S. Cl. .................................... 358/147; 358/142; 340/748; 340/750

[58] Field of Search ............... 358/141, 142, 146, 147, 358/183; 340/723, 748, 750, 799, 800

[56] References Cited

U.S. PATENT DOCUMENTS

| | | | |
|---|---|---|---|
| 4,109,244 | 8/1978 | Barnich et al. | 340/750 |
| 4,284,989 | 8/1981 | Parsons | 340/750 |
| 4,290,062 | 9/1981 | Marti et al. | 340/750 |
| 4,323,892 | 4/1982 | Kinghorn | 340/750 |
| 4,408,198 | 10/1983 | Kudirka | 340/729 |
| 4,476,464 | 10/1984 | Hobbs | 340/750 |
| 4,611,227 | 9/1986 | Brockhurst et al. | 358/141 |
| 4,677,432 | 6/1987 | Maeda et al. | 340/750 |
| 4,709,232 | 11/1987 | Leger | 340/748 |
| 4,814,756 | 3/1989 | Chauvel | 340/750 |

OTHER PUBLICATIONS

Philips Data Handbook, Electronic Components and Materials "Integrated Circuits: Part 3, Sep. 1982: ICs for Digital Systems in Radio, Audio, and Video Equipment: SAA5030 Series", pp. 1-10.

Philips Data Handbook, Electronic Components and Materials "Integrated Circuits: Part 3, Sep. 1982: ICs for Digital Systems in Radio, Audio, and Video Equipment: SAA5020 Series", pp. 1-10.

Philips Data Handbook, Electronic Components and Materials "Integrated Circuits: Book IC02a, 1986: Video and Associated Systems: Bipolar, MOS: Types MAB8031AH to TDA1521", pp. 374-375.

F. J. R. Kinghorn, "Computer Controlled Teletext"; Electronic Components and Applications; vol. 6, No. 1, 1984, pp. 15-29.

"World System Teletext Technical Specification", Revised Mar. 1985, pp. 1-10 and 38-41.

Philips Data Handbook, Electronic Components and Materials; "Integrated Circuits, Part 2: Jan. 1983: Bipolar ICs for Video Equipment: TDA2540, TDA2540Q"; pp. 1-8.

Philips Data Handbook, Electronic Components and Materials; "Integrated Circuits: Part 2: Jan. 1983: Bipolar ICs for Video Equipment: TDA 3562A"; pp. 1-16.

Philips Data Handbook, Electronic Components and Materials "Integrated Circuits: Part 3, Sep. 1982: IC's for Digital Systems in Radio, Audio, and Video Equipment: SAA3004"; pp. 1-10.

Philips Data Handbook, Electronic Components and Materials, "Integrated Circuits: Part 3, Sep. 1982: Ics for Digital Systems in Radio, Audio, and Video Equipment: SAB3035", pp. 1-4.

Philips Data Handbook, Electronic Components and Materials "Integrated Circuits: Part 3, Sep. 1982: ICs for Digital Systems in Radio, Audio and Video Equipment: TDB2033", pp. 1-9.

*Primary Examiner*—John W. Shepperd
*Assistant Examiner*—Michael D. Parker
*Attorney, Agent, or Firm*—Thomas A. Briody; Jack E. Haken; Anne E. Barschall

[57] ABSTRACT

In a teletext decoder circuit the character generator supplies picture elements at a rate of nominally approximately 6 MHz under the control of display pulses occurring at the same rate. These display pulses are derived from reference clock pulses which occur at a rate which is not a rational multiple of 6 MHz. The character generator comprises a generator circuit which receives the reference clock pulses and selects, from each series of N reference clock pulses, as many pulses as correspond to the number of horizontal picture elements constituting a character, while the time interval of N reference clock pulses corresponds to the desired width of the characters to be displayed. The character generator supplies picture elements of distinct length, while the length of a picture element is dependent on the ordinal number of this picture element in the character.

2 Claims, 7 Drawing Sheets

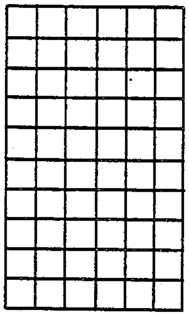
FIG.2A
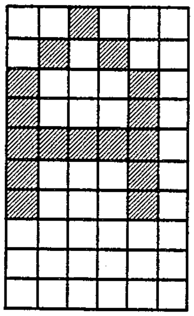
FIG.2B
| | | | | | |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 0 | 0 | 0 | 1 | 0 |
| 1 | 1 | 1 | 1 | 1 | 0 |
| 1 | 0 | 0 | 0 | 1 | 0 |
| 1 | 0 | 0 | 0 | 1 | 0 |
| 0 | 0 | 0 | 0 | 0 | 0 |
| 0 | 0 | 0 | 0 | 0 | 0 |
| 0 | 0 | 0 | 0 | 0 | 0 |
FIG.2C
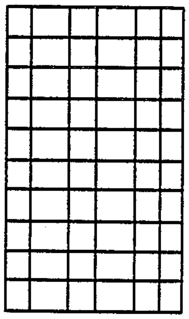
FIG.2D
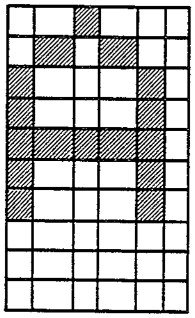
FIG.2E
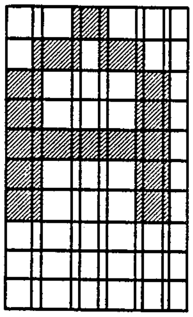
FIG.2F

TELEVISION RECEIVER INCLUDING A TELETEXT DECORDER

BACKGROUND OF THE INVENTION

1. Field of the Invention

The invention generally relates to receivers for television signals and more particularly to receivers including teletext decoders for use in a teletext transmission system.

2. Description of the Prior Art

As is generally known, in a teletext transmission system, a number of pages is transmitted from a transmitter to the receiver in a predetermined cyclic sequence. Such a page comprises a plurality of lines and each line comprises a plurality of alphanumerical characters. A character code is assigned to each of these characters and all character codes are transmitted in those (or a number of those) television lines which are not used for the transmission of video signals. These television lines are usually referred to as data lines.

Nowadays the teletext transmission system is based on the standard known as "World System Teletext", abbreviates WST. According to this standard each page has 24 lines and each line comprises 40 characters. Furthermore each data line comprises, inter alia, a line number (in a binary form) and the 40 character codes of the 40 characters of that line.

A receiver which is suitable for use in such a teletext transmission system includes a teletext decoder enabling a user to select a predetermined page for display on a screen. As is indicated in, for example, Reference 1, a teletext decoder comprises, inter alia, a video input circuit (VIP) which receives the received television signal and converts it into a serial data flow. This flow is subsequently applied to an acquisition circuit which selects those data which are required for building up the page desired by the user. The 40 character codes of each teletext line are stored in a page memory which at a given moment thus comprises all character codes of the desired page. These character codes are subsequently applied one after the other and line by line to a character generator which supplies such output signals that the said characters become visible when signals are applied to a display.

For the purpose of display each character is considered as a matrix of $m_1 \times m_2$ picture elements which are displayed row by row on the screen. Each picture element corresponds to a line section having a predetermined length (measured with respect to time); for example, q$\mu$sec. Since each line of a page comprises 40 characters and each character has a width of $m_1$q$\mu$sec, each line has a length of 40 $m_1\mu$sec. In practice a length of approximately 36 to 44 $\mu$sec appears to be a good choice. In the teletext decoder described in Reference 1 line length of 40 $\mu$sec and a character width of 1 $\mu$sec at $m_1=6$ have been chosen.

The central part of the character generator is constituted by a memory which is sub-divided into a number of submemories, for example, one for each character. Each sub-memory then comprises $m_1 \times m_2$ memory locations each corresponding to a picture element and the contents of each memory location define whether the relevant picture element must be displayed in the so-called foreground colour or in the so-called background colour. The contents of such a code memory location will be referred to as character picture element code. This memory is each time addressed by a character code and a row code. The character code selects the sub-memory and the row code selects the row of $m_1$ memory elements whose contents are desired. The memory thus supplies groups of msimultaneously occurring character picture element codes which are applied to a converter circuit. This converter circuit usually includes a buffer circuit for temporarily storing the $m_1$ substantially presented character picture element codes. It is controlled by display clock pulses occurring at a given rate and being supplied by a generator circuit. It also supplies the $m_1$ character picture element codes, which are stored in the buffer circuit, one after the other and at a rate of the display clock pulses. The serial character picture element codes thus obtained are applied to a display control circuit converting each character picture element code into an R, a G and a B signal value for the relevant picture element, which signal values are applied to the display device (for example, display tube).

The frequency $f_d$ at which the display clock pulses occur directly determines the length of a picture element and hence the character width. In the above-mentioned case in which $m_1=6$ and in which a character width of 1 $\mu$sec is chosen, this means that $f_d=6$ MHz. A change in the rate of the display clock pulses involves a change in the length of a line of the page to be displayed (now 40 $\mu$sec). In practice a small deviation of, for example, not more than 5% appears to be acceptable. For generating the display clock pulses the generator circuit receives reference clock pulses. In the decoder circuit described in Reference 1 these reference clock pulses are also supplied at a rate of 6 MHz, more specifically by an oscillator specially provided for this purpose.

OBJECT AND SUMMARY OF THE INVENTION

A particular object of the invention is to provide a teletext decoder circuit which does not include a separate 6 MHz oscillator but in which for other reasons clock pulses, which are already present in the television receiver, can be used as reference clock pulses, which reference clock pulses generally do not occur at a rate which is a rational multiple of the rate at which the display clock pulses must occur.

According to the invention, the generator circuit is adapted to partition the series of reference clock pulses applied thereto into groups of N reference clock pulses each, in which N clock pulse periods correspond to the desired width of a character to be displayed, and to select of each such group $m_1$ clockpulses to function as display clock pulses;

the converter circuit is adapted to supply each character picture element code during a period which is dependent on the ordinal number of the character picture element code in the series of $m_1$ character picture element codes.

The invention has resulted from research into teletext decoder circuits for use in the field of digital video signal processing in which a 13.5 MHz clock generator is provided for sampling the video signal. The 13.5 MHz clock pulses supplied by this clock generator are now used as reference clock pulses. The generator circuit partitions these reference clock pulses into groups of N clock pulses periods each. The width of such a group is equal to the desired character width. Since a character comprises rows of $m_1$ picture elements, $m_1$ reference clock pulses are selected from such a group which clock pulses are distributed over this group as regularly as possible. Since the mutual distance between the display clock pulses thus obtained is not constantly the same, further measures will have to be taken to prevent undesired gaps from occurring between successive picture elements when a character is displayed. Since the length of a picture element is determined by the period during which the converter circuit supplies a given character picture element code, this period has been rendered dependent on the ordinal number of the character picture element code in the series of $m_1$ character picture element codes.

REFERENCES

1. Computer-controlled teletext, J. R. Kinghorn; Electronic Components and Applications, Vol. 6, No. 1, 1984, pages 15-29.

2. Video and associated systems, Bipolar, MOS; Types MAB 8031 AH to TDA 1521: Philips' Data Handbook, Integrated circuits, Book ICO2a 1986, pages 374,375.

3. Bipolar IC's for video equipment; Philips' Data Handbook, Integrated Circuits Part 2, January 1983.

4. IC' for digital systems in radio, audio and video equipment, Philips' Data Handbook, Integrated Circuits Part 3, September 1982.

BRIEF DESCRIPTION OF THE DRAWINGS

FIG. 2 shows different matrices of picture elements constituting a character;

EXPLANATION OF THE INVENTION

General structure of a TV receiver

Figure 1:
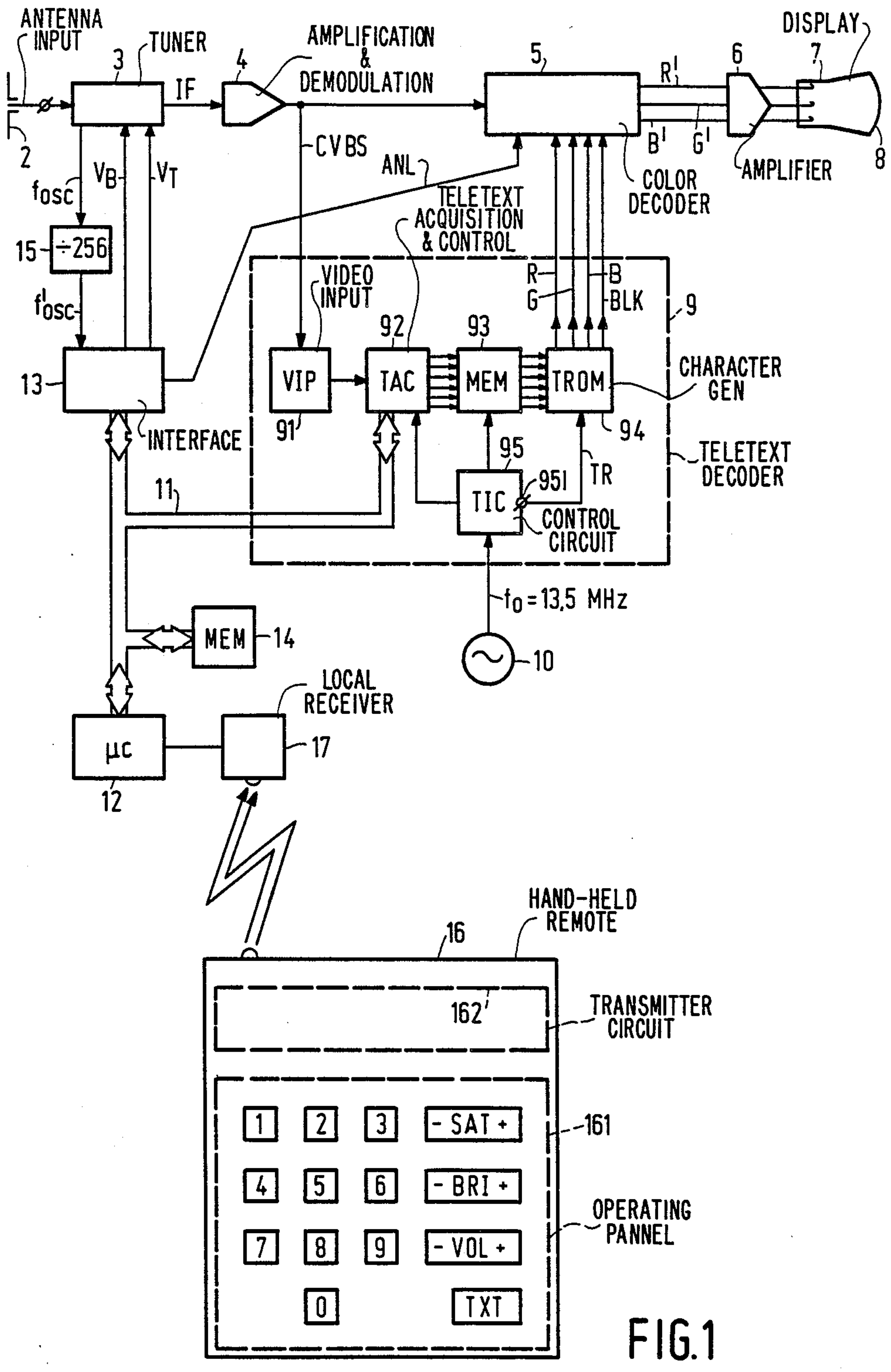
FIG. 1 shows the general structure of a television receiver including a teletext decoder circuit.

FIG. 1 shows diagrammatically the general structure of a colour television receiver. It has an antenna input 1 connected to an antenna 2 receiving a television signal modulated on a high-frequency carrier, which signal is processed in a plurality of processing circuits. More particularly, it is applied to a tuning circuit 23 (tuner or channel selector). This circuit receives a band selection voltage $V_B$ in order to enable the receiver to be tuned to a frequency within one of the frequency bands VHF1, VHF2, UHF, etc. The tuning circuit also receives a tuning voltage $V_T$ with which the receiver is tuned to the desired frequency within the selected frequency band.

This tuning circuit 3 supplies an oscillator signal having a frequency of $f_{OSC}$ on the one hand and an intermediate frequency video signal IF on the other hand. The latter signal is applied to an intermediate frequency amplification and demodulation circuit 4 supplying a baseband composite video signal CVBS. The Philips IC TDA 2540 described in Reference 3 can be used for this circuit 4.

The signal CVBS thus obtained is also applied to a colour decoder circuit 5. this circuit supplies the three primary colour signals R', G' and B' which in their turn are applied via an amplifier circuit 6 to a display device 7 in the form of a display tube for the display of broadcasts on a display screen 8. In the colour decoder circuit 5 colour saturation, contrast and brightness are influenced by means of control signals ANL. The circuit also receives an additional set of primary colour signals R, G and B and a switching signal BLK (blanking) with which the primary colour signals R', G' and B' can be replaced by the signals R, G and B of the additional set of primary colour signals. A Philips IC of the TDA 356X family described in Reference 3 can be used for this circuit 5.

The video signal CVBS is also applied to a teletext decoder circuit 9. This circuit comprises a video input circuit 91 which receives the video signal CVBS and converts it into a serial data flow. This flow is applied to a circuit 92 which will be referred to as teletext acquisition and control circuit (abbreviated TAC circuit). This circuit selects that part of the data applied thereto which corresponds to the teletext page desired by the viewer. The character codes defined by these data are stored in a memory 93 which is generally referred to as page memory and are applied from this memory to a character generator 94 supplying an R, a G and a B signal for each picture element of the screen 8. It is to be noted that this character generator 94 also supplies the switching signal BLK in this embodiment. As is shown in the Figure, the teletext acquisition and control circuit 92, the page memory 93 and the character generator 94 are controlled by a control circuit 95 which receives reference clock pulses with a frequency $f_o$ from a reference clock oscillator 10. The control circuit 95 has such a structure that it supplies the same reference clock pulses from its output 951 with a phase which may be slightly shifted with respect to the reference clock pulses supplied by the clock pulse oscillator 10 itself. The reference clock pulses occurring at this output 951 will be denoted by TR.

The Philips IC SAA 5030 may be used as video input circuits 91, the Philips IC SAA 5040 may be used as teletext acquisition and control circuit, a 1K8 RAM may be used as page memory, a modified version of the Philips IC SAA 5050 may be used as character generator 94 and a modified version of the Philips IC SAA 5020 may be used as control circuit 95, the obvious modification being a result of the fact that this IC is originally intended to receive reference clock pulses at a rate of 6 MHz for which 13.5 MHz has now been taken.

The acquisition and control circuit 92 is also connected to a bus system 11. A control circuit 12 in the form of a microcomputer, an interface circuit 13 and a non-volatile memory medium 14 are also connected to this system. The interface circuit 13 supplies the said band selection voltage $V_B$, the tuning voltage $V_T$ and the control signals ANL for controlling the analog functions of contrast, brightness and colour saturation. It receives an oscillator signal at the frequency $f'_{OSC}$ which is derived by means of a frequency divider 15, a dividing factor of which is 256, from the oscillator signal at the frequency $f_{OSC}$ which is supplied by the tuning circuit 3. Tuning circuit 3, frequency divider 15 and interface circuit 13 combined constitute a frequency synthesis circuit. The Philips IC SAB 3035 known under the name of CITAC (Computer Interface for Tuning and Analog Control) and described in Reference 4 can be used as interface circuit 13. A specimen from the MAB 84XX family, manufactured by Philips, can be used as a microcomputer.

The memory medium 14 is used, for example, for storing tuning data of a plurality of preselected transmitter stations (or programs). When such tuning data are applied to the interface circuit 13 under the control of the microcomputer 12, this circuit supplies a given band selection voltage $V_B$ and a given tuning voltage $V_T$ so that the receiver is tuned to the desired transmitter.

For operating this television receiver an operating system is provided in the form of a remote control system comprising a hand-held apparatus 16 and a local receiver 17. This receiver 17 has an output which is connected to an input (usually the "interrupt" input) of the microcomputer 12. It may be constituted by the Philips IC TDB 2033 described in Reference 4 and is then intended for receiving infrared signals which are transmitted by the hand-held apparatus 16.

The hand-held apparatus 16 comprises an operating panel 161 with a plurality of figure keys denoted by the FIGS. 0 to 9 inclusive, a colour saturation key SAT, a brightness key BRI, a volume key VOL, and a teletext key TXT. These keys are coupled to a transmitter circuit 162 for which, for example, the Philips IC SAA 3004, which has extensively been described in Reference 4, can be used. When a key is depressed, a code which is specific of that key is generated by the transmitter circuit 162, which code is transferred via an infrared carrier to the local receiver 17, demodulated in this receiver and subsequently presented to the microcomputer 12. This microcomputer thus receives operating instructions and activates, via the bus system 11, one of the circuits connected thereto. It is to be noted that an operating instruction may be a single instruction, that is to say, it is complete after depressing only one key. It may also be multiple, that is to say, it is not complete until two or more keys have been depressed. This situation occurs, for example, when the receiver is operating in the teletext mode. Operation of figure keys then only yields a complete operating instruction when, for example, three figure keys have been depressed. As is known, such a combination results in the page number of the desired teletext page.

The character generator

As already stated, a character is a matrix comprising $m_2$ rows of $m_1$ picture elements each. Each picture element corresponds to a line section of a predetermined length (measured with respect to time); for example, q/μsec. Such a matrix is indicated at A in FIG. 2 for $m_1=6$ and $m_2=10$. More particularly this is the matrix of a dummy character. The character for the letter A is indicated at B in the same FIG. 2. It is to be noted that the forty characters constituting a line of teletext page are contiguous to one another without any interspace. The sixth column of the matrix then ensures the required spacing between the successive letters and figures.

Figure 3:
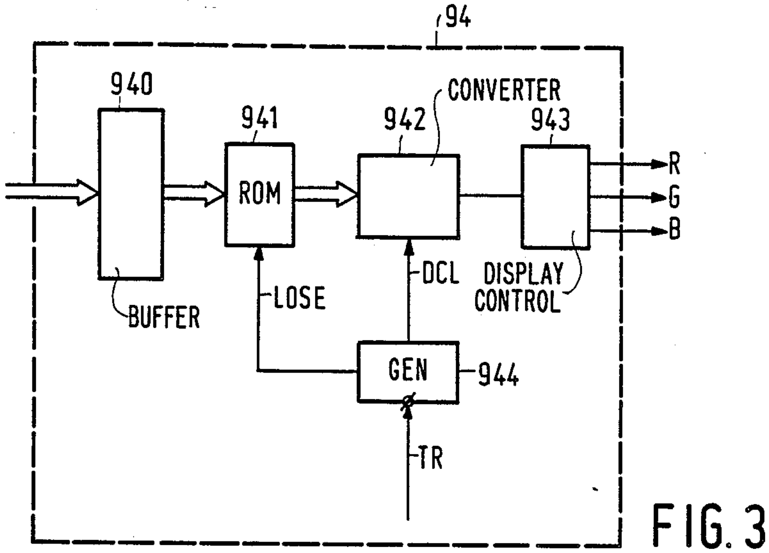
FIG. 3 shows diagrammatically the general structure of a character generator.

FIG. 3 shows diagrammatically the general structure of the character generator described in Reference 2 and adapted to supply a set of R, G and B signals for each picture element of the character. This character generator comprises a buffer 940 which receives the character codes from memory 93 (see FIG. 1). These character codes address a sub-memory in a memory medium 941, which sub-memory consists of $m_1 \times m_2$ memory elements each comprising a character picture element code. Each $m_1 \times m_2$ character picture element code corresponds to a picture element of the character and defines, as already stated, whether the relevation picture element must be displayed in the so-called foreground colour or in the so-called background colour. Such a character picture element code has the logic value "0" or "1". A "0" means that the corresponding picture element must be displayed in the background colour (for example, white). The "1" means that the corresponding picture element must be displayed in the foreground colour (for example, black or blue). At C in FIG. 2 there is indicated, the contents of the sub-memory for the character shown at B in FIG. 2.

The addressed sub-memory is read now by row under the control of a character row signal LOSE. More particularly, all first rows are read of the sub-memories of the forty characters of a teletext line, subsequently all second rows are read, then all third rows are read and so forth until finally all tenth rows are read.

The six character element codes of a row will hereinafter be referred to as CH(1), CH(2), . . . CH(6). They are made available in parallel by the memory medium 941 and are applied to a converter circuit 942 operating as a parallel-series converter. In addition to the six character picture element codes it receives display clock pulses DCL and applies these six character picture element codes one by one at the rate of the display clock pulses to a display control circuit 943 which converts each character picture element code into a set of R, G, B signals.

The display clock pulses DCL and the character row signal LOSE are supplied in known manner (see Reference 2, page 391) by a generator circuit 944 which receives the reference clock pulses TR from the control circuit 95 (see FIG. 1), which reference clock pulses have a rate $f_0$. In the character generator described in Reference 2, page 391, $f_0$ is 6 MHz and the display clock pulses DCL occur at the same rate. The converter circuit thus supplies the separate character picture element codes at a rate of 6 MHz. The picture elements shown at A and B therefore have a length of 1/6 μsec each and a character thus has a width of 1 μsec.

When the rate of the reference clock pulses increases, the rate of the display clock pulses also increases and the character width decreases. Without changing the character width the above-described character generator can also be used without any essential changes if the rate of the reference clock pulses is an integral multiple of 6 MHz. In that case the desired display clock pulses can e derived from the reference clock pulses by means of a divider circuit with an integral dividing number. However, there is a complication if $f_0$ is not a rational multiple of 6 MHz, for example, if $f_0=13.5$ MHz and each character nevertheless must have a width of substantially 1 μsec. Two generator circuits and a plurality of converter circuits suitable for use in the character generator shown in FIG. 3 and withstanding the above-mentioned complication will be described hereinafter.

Figure 4:
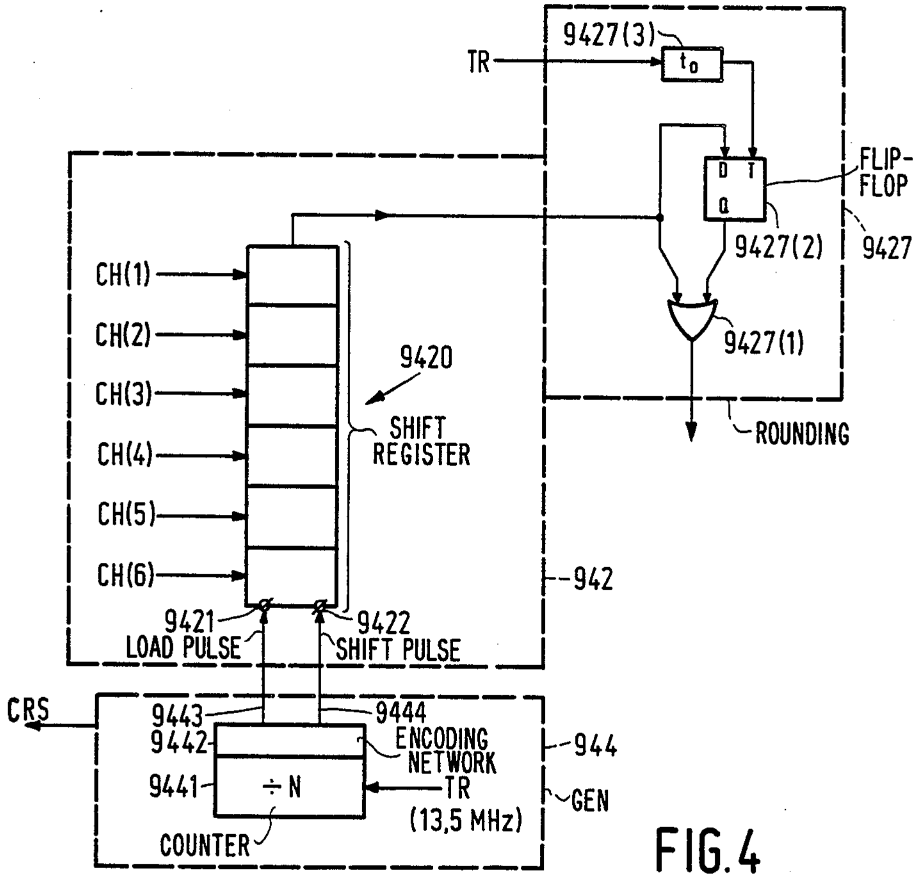
FIG. 4 shows an embodiment of a converter circuit and a generator circuit for use in the character generator shown in FIG. 3.

FIG. 4 shows an embodiment of the generator circuit 944 and the converter circuit 942. The reference clock pulses TR are assumed to occur at a rate of 13.5 MHz. To derive the desired display clock pulses from these reference clock pulses, the generator circuit 944 comprises a modulo-N-counter circuit 9441 which receives the 13.5 MHz reference clock pulses TR indicated at A in FIG. 5. The quantity N is chosen to be such that N clock pulse periods of the reference clock pulses substantially correspond to the desired character width of, for example, 1 μsec. This is the case for N=14, which yields a character width of 1.04 μsec.

An encoding network 9442 comprising two output lines 9443 and 9444 is connected to this modulo-N-counter circuit 9441. This encoding network 9442 each time supplies a display clock pulse in response to the first, the third, the sixth, the eighth, the eleventh and the thirteenth reference clock pulse in a group of fourteen reference clock pulses. More particularly the display clock pulse, which is obtained each time in response to the first reference clock pulse of a group, is applied to the output line 9443, whilst the other display clock pulses are applied to the output line 9444. Thus, the pulse series shown at B and C in FIG. 5 occur at these output lines 9443 and 9444, respectively.

The converter circuit 942 is constituted by a shift register circuit 9420 comprising six shift register elements each being suitable for storing a character picture element code CH(.) which is supplied by the memory medium 941 (see FIG. 3). This shift register circuit 9420 has a load pulse input 9421 and a shift pulse input 9422. The load pulse input 9421 is connected to the output line 9443 of the encoding network 9442 and thus receives the display clock pulses indicated at B in FIG. 5. The shift pulse input 9422 is connected to the output line 9444 of the encoding network 9442 and thus receives the display clock pulses indicated at C in FIG. 5.

This converter circuit operates as follows. Whenever a display clock pulse occurs at the load pulse input 9421, the six character picture element codes CH(.) are loaded into the shift register circuit 9420. The first character picture element code CH(1) thereby becomes immediately available at the output. The contents of the shift register elements are shifted one position in the direction of the output by each display clock pulse at the shift pulse input 9422.

Since the display clock pulses occur at mutually unequal distances, the time interval during which a character picture element code is available at the output of the shift register circuit is longer for the one character picture element code than for the other. This is shown in the time diagrams D of FIG. 5. More particularly the diagrams show for each character picture element code CH(.) during which reference clock pulse periods the code is available at the output of the shift register circuit. The result is that the picture elements from which the character is built up upon display also have unequal lengths as is indicated at D and E in FIG. 2.

Figure 6:
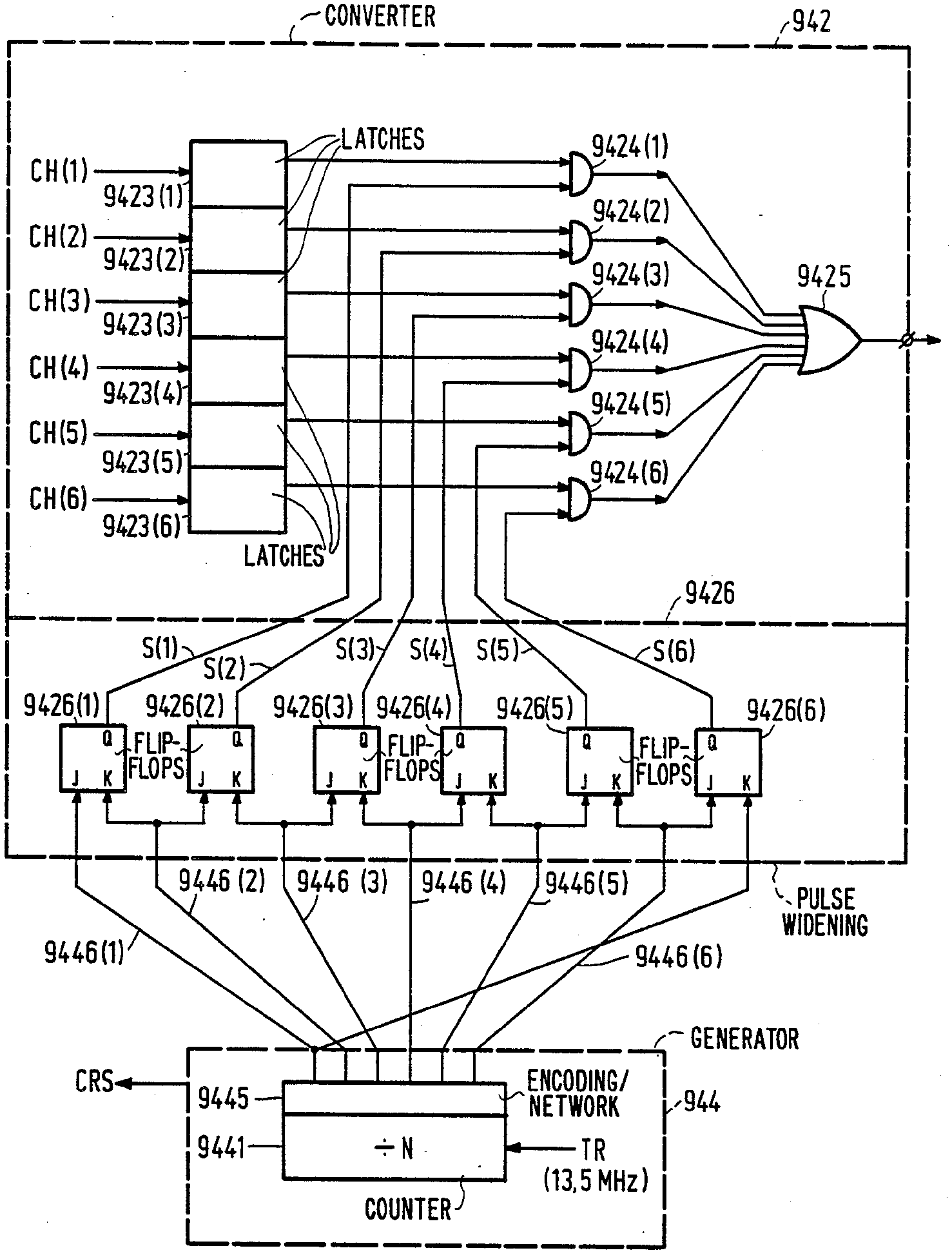
FIG. 6 shows another embodiment of a converter circuit and a generator circuit for use in the character generator shown in FIG. 3.

The same character display is obtained by implementing the converter circuit 942 and the generator circuit 944 in the way shown in FIG. 6. The generator circuit 944 again comprises the modulo-N-counter circuit 9441 with N=14 which receives the 13.5 MHz reference clock pulses TR shown at A in FIG. 7. An encoding network 9445 is also connected to this counter circuit, which network now comprises six output lines 9446(.). This encoding network 9445 again supplies a display clock pulse in response to the first, the third, the sixth, the eighth, the eleventh and the thirteenth reference clock pulse of a group of fourteen reference clock pulses, which display clock pulses are applied to the respective output lines 9446(1), . . . , 9446(6). Thus, the pulse series indicated at B, C, D, E, F and G in FIG. 7 occur at these outputs.

Figure 7:
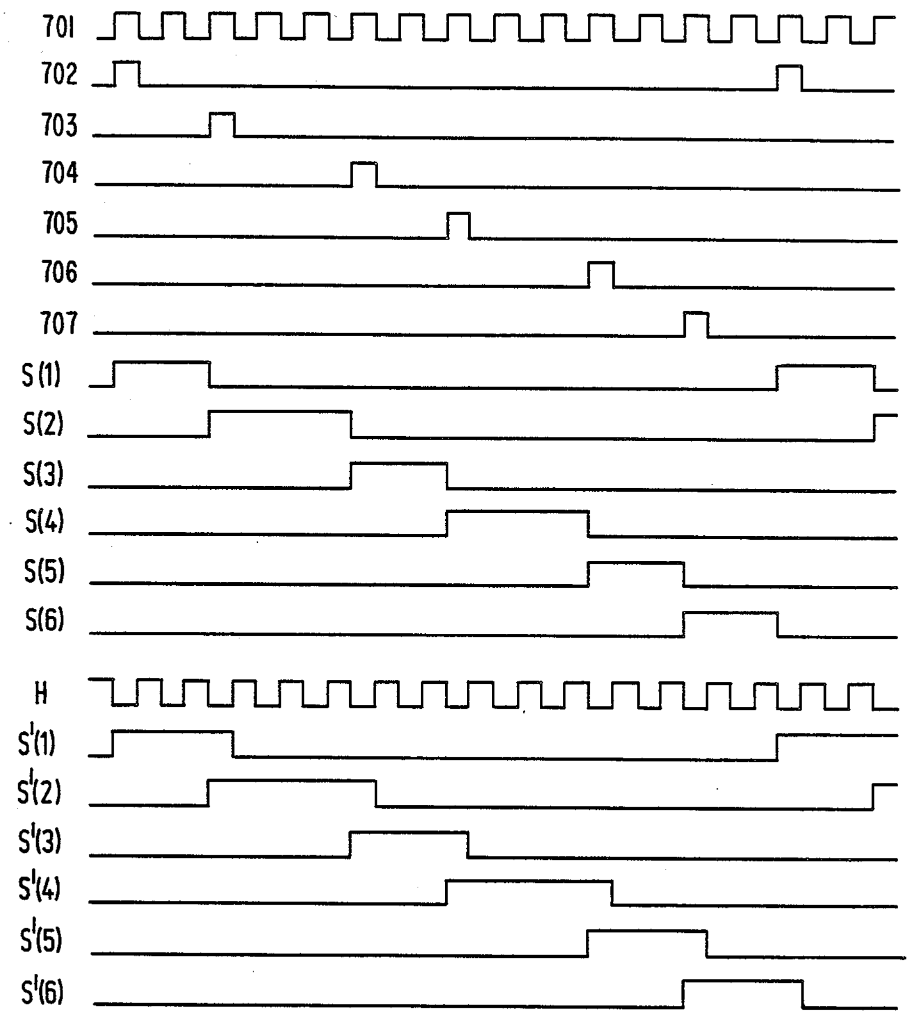
FIG. 7 shows some time diagrams to explain its operation.

The converter circuit 942 has six latches 9423(.) each adapted to store a character picture element code CH(.). The outputs of these latches are connected to inputs of respective AND gate circuits 9424(.). Their outputs are connected to inputs of an OR gate circuit 9425. The AND gate circuit is 9424(.) are controlled by the control signals S(1) to S(6), respectively, which are derived by means of a pulse widening circuit 9426 from the display clock pulses occurring at the output lines 9446(.) of the encoding network 9445 and which are also shown in FIG. 7. Such a control signal S(i) determines how long the character picture element code CH(i) is presented to the output of the OR gate circuit 9425 and hence determines the length of the different picture elements of the character on the display screen.

As is shown in FIG. 6, the pulse widening circuit 9426 may be constituted by a plurality of JK flip-flops 9426(.) which are connected to the output lines of the encoding network 944, in the manner shown in the Figure. It is to be noted that the function of the pulse widening circuit 9426 may also be included in the encoding network 9445. In that case this function may be realized in a different manner.

Figure 5:
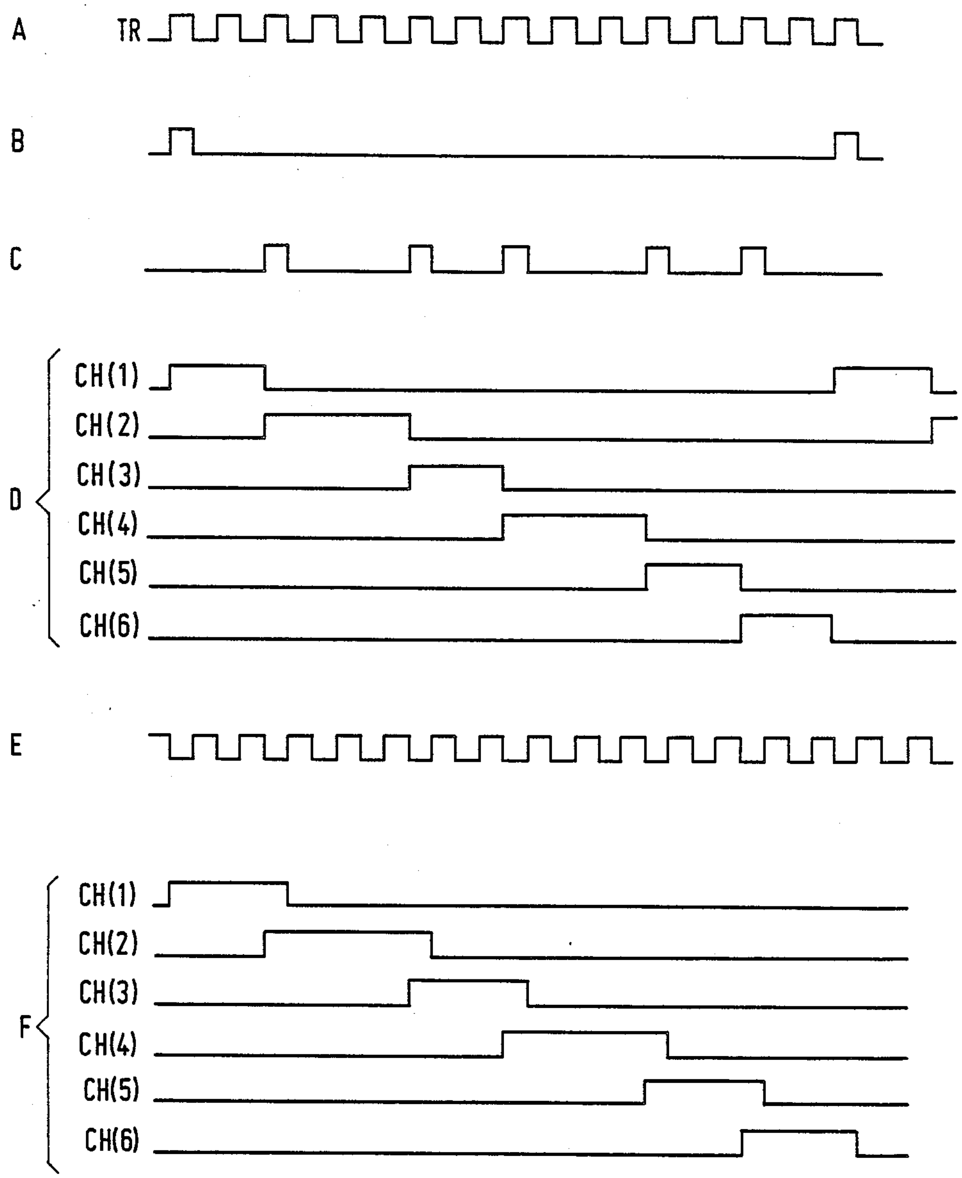
FIG. 5 shows some time diagrams to explain its operation.

In the above-described embodiments of the converter circuit 942 and the generator circuit 944 the character generator supplies exactly contiguous picture elements on the display screen. This means that the one picture elements begins immediately after the previous picture element has ended. The result is that round and diagonal shapes become vague. It is therefore common practice to realize a rounding for such shapes. This rounding can be realized with the converter circuit shown in FIGS. 4 and 6 by ensuring that two consecutive picture elements partly overlap each other. This is realized in the converter circuit shown in FIG. 4 by means of a rounding circuit 9427 which receives the character picture element codes occurring at the output of the shift register circuit 9420. This rounding circuit 9427 comprises an OR gate 9427(1) and a D flip-flop 9427(2). The T input of this flip-flop receives the clock pulses shown at E in FIG. 5, which pulses are derived from the reference clock pulses TR by means of a delay circuit 9427(3). This circuit has a delay time $t_0$ for which a value in the time diagram indicated at E in FIG. 5 is chosen which corresponds to half a clock pulse period of the reference cock pulses. The character picture element codes supplied by the shift register circuit 9420 are now applied directly and via the D flip-flop 9427(2) to the OR gate which thereby supplies the six character picture element codes CH(.) in the time intervals as indicated at F in FIG. 5. The result of this measure for the display of the character with the letter A is shown at F in FIG. 2.

Figure 8:
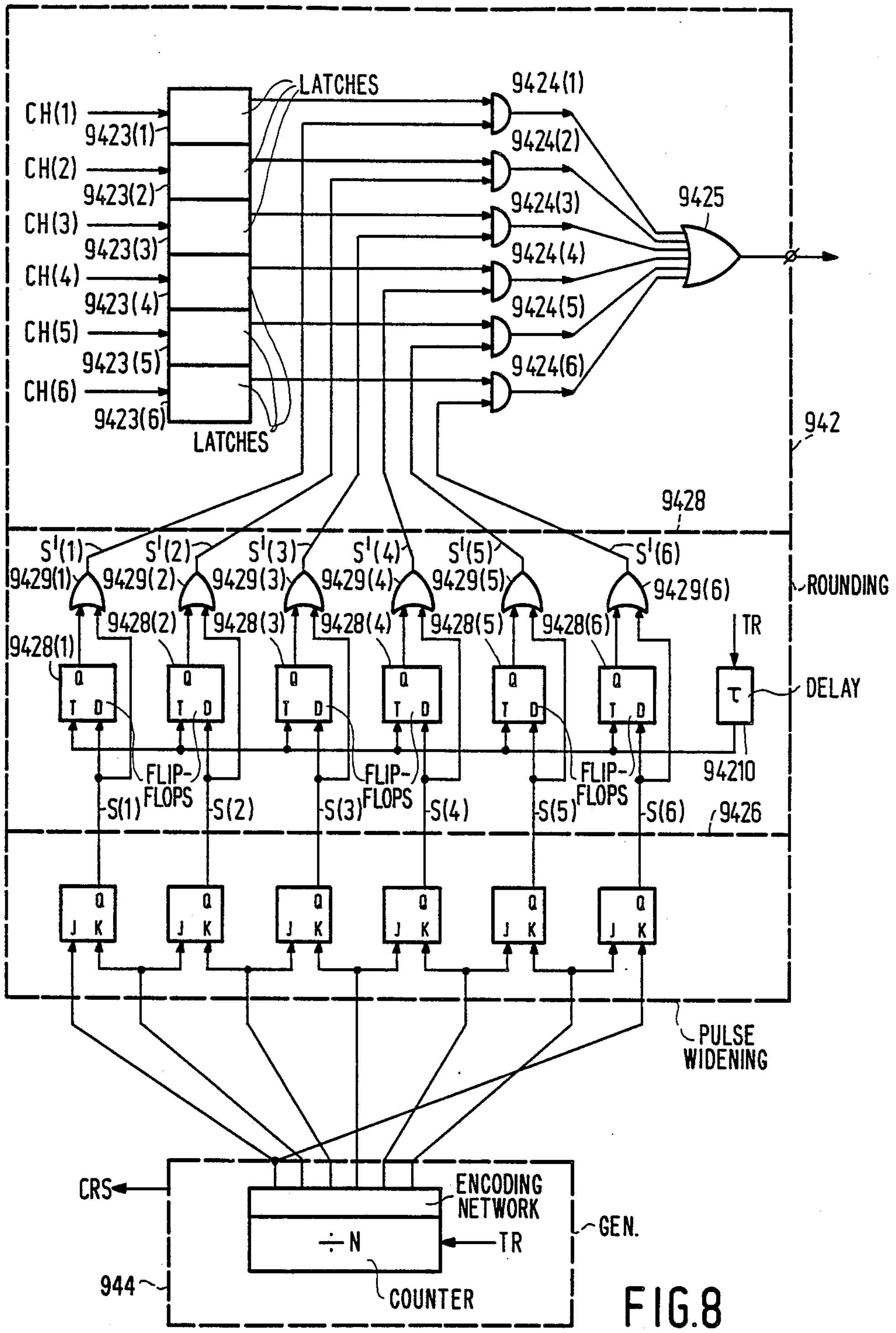
FIG. 8 shows a modification of the converter circuit shown in FIG. 6, adapted to round the characters.

The same rounding effect can be realized by means of the converter circuit shown in FIG. 6, namely by providing it with a rounding circuit as well. This is shown in FIG. 8. In this FIG. 8 the elements corresponding to those in FIG. 6 have the same reference numerals. The converter circuit 942 shown in FIG. 8 differs from the circuit shown in FIG. 6 in that the said rounding circuit denoted by the reference numeral 9428 is incorporated between the pulse widening circuit 9426 and the AND gate circuits 9424(.). More particularly this rounding circuit is a pluriform version of the rounding circuit 9427 shown in FIG. 4 and is constituted by six D flip-flops 9428(.) and six OR gates 9429(.). These OR gates receive the respective control signals S(1) to S(6) directly and via the D flip-flops. The T inputs of these D flip-flops again receive the version of the reference clock pulses delayed over half a reference clock pulse period by means of the delay circuit 94210. This rounding circuit thus supplies the control signals S'(.) shown in FIG. 7.

What is claimed is:

1. A receiver for television signal s including a teletext decoder circuit for decoding teletext signals constituted by character codes which are transmitted in the television signal, and comprising:

a video input circuit receiving the television signal and converting it into a serial data flow;

an acquisition circuit for receiving the serial data flow supplied by the video input circuit and selecting that part therefrom which corresponds to the teletext page described by the viewer;

a character generator comprising:

a memory medium addressed by the character codes which together represent the teletext page desired by the user and which in response to each character code successively supply $m_2$ series of $m_1$ simultaneously occurring character picture element codes each indicating wether a corresponding picture element of the character must be displayed in the foreground colour or in the background colour;

a generator circuit receiving a series of reference clock pulses and deriving display clock pulses therefrom;

a converter circuit receiving each series of $m_1$ simultaneously occurring character picture element codes as well as the display clock pulses for supplying the $m_1$ character picture element codes of a series one after the other and at the display clock pulse rate;

a display control circuit receiving the serial character picture element codes and converting each into an R, a G and a B signal for the relevant picture element of the character to be displayed;

characterized in that the generator circuit is adapted to partition the series of reference clock pulses applied thereto into groups of N reference clock pulses each, in which N reference clock pulse periods correspond to the desired width of a character to be displayed, and to select from each such group $m_1$ clock pulse to function as display clock pulses;

the converter circuit is adapted to supply each character picture element code during a period which is dependent on the ordinal number of the character picture element code in the series of $m_1$ character picture element codes.

2. A character generator for use in a receiver teletext claim 1, comprising:

a memory medium which is addressable by character codes and successively applies $m_2$ series of $m_1$ simultaneously occurring character picture element codes in response to a character code applied as an address thereto, each character picture element code indicating whether a corresponding picture element of the character must be displayed in the foreground colour or in the background colour;

a generator circuit receiving a series of reference clock pulses and deriving display clock pulses therefrom;

a converter circuit receiving each series of $m_1$ simultaneously occurring character picture element codes and the display clock pulses for supplying the $m_1$ character picture element codes of the series one after the other at the display clock pulse rate;

a display control circuit receiving the serial character picture element codes and converting each into an R, a G and a B signal for the relevant picture element of the character to be displayed; characterized in that the generator circuit is adapted to partition the series of reference clock pulses applied thereto into groups of N reference clock pulses each, in which N reference clock pulse periods correspond to the desired width of a character to be displayed, and to select from each such group $m_1$ clock pulses to function as display clock pulses;

the converter circuit is adapted to supply each character picture element code during a period which is dependent on the ordinal number of the character picture element code in the series of $m_1$ character picture element codes.

* * * * *